United States Patent
Stajner et al.

(10) Patent No.: US 10,996,061 B2
(45) Date of Patent: May 4, 2021

(54) APPARATUS AND ASSOCIATED METHOD FOR USE IN UPDATING MAP DATA

(71) Applicant: HERE Global B.V., Eindhoven (NL)

(72) Inventors: Tadej Stajner, Berlin (DE); Olivier Dousse, Berlin (DE); Daniel Seyde, Berlin (DE); Dmitry Skripin, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 124 days.

(21) Appl. No.: 15/889,309

(22) Filed: Feb. 6, 2018

(65) Prior Publication Data

US 2018/0224285 A1      Aug. 9, 2018

(30) Foreign Application Priority Data

Feb. 7, 2017   (EP) .................................... 17154967

(51) Int. Cl.
*G01C 21/32* (2006.01)
*G09B 29/00* (2006.01)

(52) U.S. Cl.
CPC ........... *G01C 21/32* (2013.01); *G09B 29/004* (2013.01)

(58) Field of Classification Search
CPC .............................. G01C 21/32; G09B 29/004
See application file for complete search history.

(56) References Cited

U.S. PATENT DOCUMENTS

| | | |
|---|---|---|
| 5,436,840 A | 7/1995 | Lam et al. |
| 6,385,539 B1 | 5/2002 | Wilson et al. |
| 6,681,180 B2 | 1/2004 | Bevly et al. |
| 7,706,971 B2 | 4/2010 | Jaugilas et al. |
| 7,724,184 B2 | 5/2010 | Waid |
| 8,060,275 B2 | 11/2011 | Asgari et al. |
| 8,284,995 B2 | 10/2012 | Diaz et al. |
| 8,560,218 B1 | 10/2013 | Kahn et al. |

(Continued)

FOREIGN PATENT DOCUMENTS

| | | |
|---|---|---|
| WO | WO-2009/059766 | 5/2009 |
| WO | WO-2014/125802 | 8/2014 |

OTHER PUBLICATIONS

Velaga et al. "Detecting and Correcting Map-Matching Errors in Location-Based Intelligent Transport Systems." 12th World Conference on Transport Research, Jul. 11, 2010-Jul. 15, 2010, Lisbon, 17 pages.

(Continued)

*Primary Examiner* — Nicholas K Wiltey
*Assistant Examiner* — Tiffany K Luu
(74) *Attorney, Agent, or Firm* — Alston & Bird LLP

(57) ABSTRACT

An apparatus including a processor and memory having computer program code, the memory and computer program code configured to, with the processor, enable the apparatus at least to: use a classification model to identify one or more anomalies between a monitored trajectory of a vehicle through a road network and predefined map data for the road network which are likely caused by errors in the predefined map data; and provide details of the one or more identified anomalies for use in obtaining additional data for the specific locations on the road network corresponding to the one or more identified anomalies in order to correct the errors in the predefined map data.

17 Claims, 7 Drawing Sheets

(56) References Cited

U.S. PATENT DOCUMENTS

| | | |
|---|---|---|
| 8,786,845 B2 | 7/2014 | Lynch |
| 9,361,797 B1 | 6/2016 | Chen et al. |
| 2005/0283699 A1 | 12/2005 | Nomura et al. |
| 2008/0162041 A1* | 7/2008 | Nakamura ............ G01C 21/32 701/533 |
| 2010/0057352 A1* | 3/2010 | Nakae ................... G01C 21/30 701/532 |
| 2010/0179755 A1* | 7/2010 | Kohno ................... G01C 21/32 701/532 |
| 2012/0004845 A1* | 1/2012 | Kmiecik ............... G01C 21/32 701/445 |
| 2013/0238235 A1 | 9/2013 | Kitchel et al. |
| 2014/0074847 A1 | 3/2014 | Martens |
| 2014/0236482 A1* | 8/2014 | Dorum .................. G01C 21/34 701/533 |
| 2014/0249716 A1 | 9/2014 | Dorum et al. |
| 2015/0119082 A1 | 4/2015 | Raman |
| 2015/0153183 A1 | 6/2015 | Kadous et al. |
| 2015/0156603 A1* | 6/2015 | Zellner ................. H04W 4/046 455/456.3 |
| 2015/0317900 A1* | 11/2015 | Tashiro .................. G01C 21/32 701/117 |
| 2017/0016731 A1* | 1/2017 | Koshiba ............... G09B 29/106 |
| 2017/0183002 A1* | 6/2017 | Dai ........................ B60T 8/172 |
| 2018/0003512 A1 | 1/2018 | Lynch |
| 2018/0017396 A1 | 1/2018 | Lynch |

OTHER PUBLICATIONS

Extended European Search Report for European Patent Application No. 17154967.8 dated Oct. 27, 2017, 16 pages.

Office Action for European Application No. 17 154 967.8 dated May 23, 2019, 8 pages.

Caron, F. et al., *Particle Filtering for Multisensor Data Fusion With Switching Observation Models. Application to land Vehicle Positioning*, IEEE Transactions on Signal Processing, vol. 55, Issue 6 (2007) 32 pages.

Fletcher, A. K. et al., *Estimation From Lossy Sensor Data: Jump Linear Modeling and Kalman Filtering*, IPSN'04 (Apr. 2004) 9 pages.

Huang, Y-B. et al., *Multisensor Data Fusion for High Quality Data Analysis and Processing in Measurement and Instrumentation*, Journal of Bionic Engineering 4 (2007) 53-62.

Loebis, D. et al., *Adaptive Tuning of a Kalman Filter via Fuzzy Logic for an Intelligent AUV Navigation System*, Control Engineering Practice 12 (2004) 1531-1539.

Martyniv, A. et al., *Map-Aided Position Tracking*, Here (2015) 41 pages.

Stainer, T., *Detecting Off-Road Behavior in Vehicle Positioning Anomalies*, Here (2016) 10 pages.

\* cited by examiner

APPARATUS AND ASSOCIATED METHOD FOR USE IN UPDATING MAP DATA

CROSS-REFERENCE TO RELATED APPLICATIONS

This application claims priority to EP Application No. 17154967.8, filed Feb. 7, 2017, the entire contents of which are incorporated herein by reference.

TECHNICAL FIELD

The present disclosure relates to the field of route navigation, associated methods and apparatus, and in particular concerns an apparatus configured to classify anomalies between a monitored trajectory of a vehicle through a road network and predefined map data for the road network to identify one or more anomalies which are likely caused by errors in the predefined map data. Details of the one or more identified anomalies can then be used to obtain additional data for the specific locations on the road network corresponding to the one or more identified anomalies in order to correct the errors in the predefined map data.

Certain disclosed example aspects/embodiments relate to portable or in-vehicle navigation devices. An in-vehicle navigation device may comprise hardware with similar characteristics to that of a mobile navigation device, but usually comprises less powerful hardware designed for the task. In the present case, the portable or in-vehicle navigation device should have access to a database containing map data (either online or offline) and sensor data from one or more sensors (e.g. GNSS, inertial measurement unit, accelerometer, compass, magnetometer, gyroscope, barometer/altitude sensor, camera, LiDAR, RADAR, ultrasound sensor and the like).

BACKGROUND

Research is currently being done to develop improved navigation devices which can provide a user with more detailed and accurate information about road networks to further aid route navigation.

One or more aspects/embodiments of the present disclosure may or may not address this issue.

The listing or discussion of a prior-published document or any background in this specification should not necessarily be taken as an acknowledgement that the document or background is part of the state of the art or is common general knowledge.

SUMMARY

According to a first aspect, there is provided an apparatus comprising a processor and memory including computer program code, the memory and computer program code configured to, with the processor, enable the apparatus at least to:

use a classification model to identify one or more anomalies between a monitored trajectory of a vehicle through a road network and predefined map data for the road network which are likely caused by errors in the predefined map data; and provide details of the one or more identified anomalies for use in obtaining additional data for the specific locations on the road network corresponding to the one or more identified anomalies in order to correct the errors in the predefined map data.

The apparatus may be configured to compare the monitored trajectory and predefined map data to detect any anomalies therebetween.

The apparatus may be configured to compare two or more monitored trajectories of the vehicle as determined simultaneously by different respective sensors on the vehicle to detect any anomalies therebetween.

The classification model may be configured to classify the detected anomalies into one or more of the following classes: on-road, off-road, illegal manoeuvre, sensor irregularity, and unlikely geometry.

The classification model may comprise a supervised machine learning algorithm.

The classification model may comprise one or more of an L1-regularized logistic regression classifier and a random forest classifier.

The anomalies may comprise discrepancies in one or more of position, speed and course between the monitored trajectory and predefined map data (e.g. which exceed a predefined margin of error).

The apparatus may be configured to:
obtain the additional data for the locations on the road network corresponding to the identified anomalies; and
update the predefined map data using the obtained additional data to correct the errors therein.

The apparatus may be configured to obtain the additional data from one or more of an embedded vehicle-based data collector, a crowd-sourced fleet of vehicles, a specially-equipped vehicle with suitable sensors, a downloadable map update, and satellite or aerial imagery.

The apparatus may be configured to provide details of the identified anomalies to a further apparatus which aggregates the anomalies for multiple vehicles by time, location and category and obtains the additional data for the locations on the road network corresponding to the aggregated anomalies.

The apparatus may be configured to:
use the classification model to identify one or more anomalies which are likely caused by driver behaviour; and
provide user feedback based on the driver behaviour.

The user feedback may comprise navigation guidance.

The apparatus may be configured to:
use the classification model to identify one or more anomalies which are likely caused by at least one of sensor errors and positioning errors; and
provide user feedback based on the sensor or positioning errors.

The user feedback may comprise a visual or audible warning.

The apparatus may be configured to display the monitored trajectory, road network and one or more anomalies on a user interface.

The sensors may comprise at least one of a global navigation satellite system, an odometer, an inertial measurement unit, an inertial navigation system, an accelerometer, a gyroscope, a camera, a RADAR system and a LiDAR system.

According to a further aspect, there is provided an apparatus comprising a processor and memory including computer program code, the memory and computer program code configured to, with the processor, enable the apparatus at least to:

receive details of one or more identified anomalies between a monitored trajectory of a vehicle through a road network and predefined map data for the road network which are likely caused by errors in the predefined map data;

obtain additional data for the specific locations on the road network corresponding to the one or more identified anomalies; and update the predefined map data using the obtained additional data to correct the errors therein.

The apparatus may be one or more of an electronic device, a portable electronic device, a portable telecommunications device, a mobile phone, a personal digital assistant, a tablet, a phablet, a desktop computer, a laptop computer, a server, a smartphone, a smartwatch, smart eyewear, a portable satellite navigation device, an in-vehicle satellite navigation device, and a module for one or more of the same.

According to a further aspect, there is provided a method comprising:

using a classification model to identify one or more anomalies between a monitored trajectory of a vehicle through a road network and predefined map data for the road network which are likely caused by errors in the predefined map data; and providing details of the one or more identified anomalies for use in obtaining additional data for the specific locations on the road network corresponding to the one or more identified anomalies in order to correct the errors in the predefined map data.

According to a further aspect, there is provided a method comprising:

receiving details of one or more identified anomalies between a monitored trajectory of a vehicle through a road network and predefined map data for the road network which are likely caused by errors in the predefined map data;

obtaining additional data for the specific locations on the road network corresponding to the one or more identified anomalies; and updating the predefined map data using the obtained additional data to correct the errors therein.

According to a further aspect, there is provided a system comprising an apparatus configured to perform one of the methods described above and a further apparatus configured to perform the other method described above.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:—

DESCRIPTION OF SPECIFIC ASPECTS/EMBODIMENTS

Figure 1:
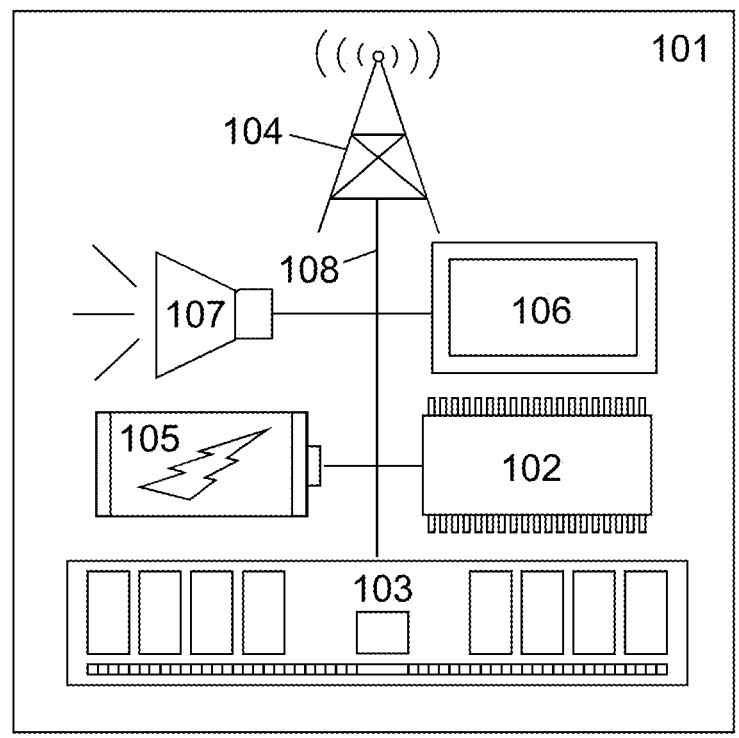
FIG. 1 shows an apparatus configured to perform one or more methods described herein.

Navigation devices need to be able to determine the current location of a vehicle relative to a map in order to provide route guidance to the driver of the vehicle. This is typically achieved using one or more on-board sensors, such as a global navigation satellite system (GNSS), an odometer, an inertial measurement unit, an inertial navigation system, an accelerometer, a gyroscope, a camera, a RADAR system and a LiDAR system. The state-of-the-art solution to this problem comprises multiple separate steps. First of all, dead reckoning (which typically combines a known reference position (e.g. from GNSS) with sensor data (e.g. from an inertial sensor)) is used to determine a trajectory and extrapolate this trajectory when no satellite signals are available (e.g. in tunnels). Next, map-matching is performed to associate the determined trajectory with the most likely path of travel on the road network. As there are often explicable shifts between the determined trajectory and the most likely path of travel (e.g. due to atmospheric conditions or reflections affecting the GNSS signals, or drifting of the dead reckoning), the map-matched position is then fed back to the dead reckoning unit so that it can be used to correct errors in the trajectory. Finally, if a lane assistance system is available, then this is used to keep track of which lane the vehicle is currently on. This module takes as an input the number of available lanes on the current road and tracks lane crossings, which allows the lateral position of the vehicle on the road to be tracked.

To enable accurate route guidance, the map data to which the current location is compared must be up-to-date. Maintaining a high definition map requires not just an initial investment in obtaining the initial snapshot of the geometry, but also an ongoing effort in maintaining its correctness in light of constant changes and temporary disruptions. As semi-autonomous and autonomous vehicles continue to rely on the accuracy, the process of collecting the data to maintain the maps is an important consideration.

The current process involves detecting changes in the road network by observing GNSS probe data emitted by cars equipped with navigation and positioning systems. While this technique is sufficient to determine direction of travel and the presence of a connection, the spatial accuracy and temporal sampling rate are insufficient as a high-definition geometry data source which could be used to re-construct a road geometry. Furthermore, GNSS probe data only contains the coordinates, speed and course, and lacks information on their estimated accuracy. In addition, the exact specifications of the system vary from vehicle to vehicle, so it is not known whether a particular system is using map feedback or any form of sensor fusion.

Although additional on-board sensors (such as those listed above) may be used to supplement the GNSS probe data, this would increase data bandwidth for the car manufacturers who ultimately carry the cost of the mobile internet connections used to collect it.

There will now be described an apparatus and associated methods that may address this issue.

FIG. 1 shows an apparatus 101 configured to perform one or more methods described herein. The apparatus 101 may be at least one of an electronic device, a portable electronic device, a portable telecommunications device, a mobile phone, a personal digital assistant, a tablet, a phablet, a desktop computer, a laptop computer, a server, a smartphone, a smartwatch, smart eyewear, a portable satellite navigation device, an in-vehicle satellite navigation device, and a module for one or more of the same.

In this example, the apparatus 101 comprises a processor 102, a memory 103, a transceiver 104, a power supply 105, an electronic display 106 and a loudspeaker 107, which are electrically connected to one another by a data bus 108. The processor 102 is configured for general operation of the apparatus 101 by providing signalling to, and receiving signalling from, the other components to manage their operation. The memory 103 is configured to store computer program code configured to perform, control or enable operation of the apparatus 101. The memory 103 may also be configured to store settings for the other components. The processor 102 may access the memory 103 to retrieve the component settings in order to manage the operation of the other components. The processor 102 may be a microprocessor, including an Application Specific Integrated Circuit (ASIC). The memory 103 may be a temporary storage medium such as a volatile random access memory. On the other hand, the memory 103 may be a permanent storage medium such as a hard disk drive, a flash memory, or a non-volatile random access memory.

The transceiver 104 is configured to transmit data to, and/or receive data from, other apparatus/devices. As described in more detail below, this data may comprise the details of one or more anomalies identified between a monitored trajectory of a vehicle through a road network and predefined map data for the road network, and/or additional data for the specific locations on the road network corresponding to the one or more identified anomalies.

The power supply 105 is configured to provide the other components with electrical power to enable their functionality, and may comprise one or more of a mains adapter, a battery, a capacitor, a supercapacitor, and a battery-capacitor hybrid. The electronic display 106 may be an LED, LCD or plasma display, and is configured to display visual content which is stored on (e.g. on the storage medium) or received by (e.g. via the transceiver) the apparatus 101. Similarly, the loudspeaker 107 is configured to output audio content which is stored on or received by the apparatus 101. The visual and audio content may comprise related components of a combined audio visual content. In some examples, the audio and/or visual content may comprise navigational content (such as geographical information and directions, distances, speeds or times of travel).

There may be a number of different reasons why a monitored vehicle trajectory deviates from the predefined map data. For example, there may be errors in the map topology or geometry, the driver may not obey the traffic rules or stay on the road, the on-board sensors may be inaccurate, or there may be disruptions to the sensor data collection process. It follows, therefore, that only some anomalies between the monitored vehicle trajectory and the predefined map data are actually caused by errors in the predefined map data which need to be corrected. It can, however, be difficult to distinguish those anomalies from others at the positioning level because many anomalies have confusingly similar signatures with equally low likelihoods of matching the predefined map data.

The present apparatus is configured to use a classification model to identify one or more anomalies between a monitored trajectory of a vehicle through a road network and predefined map data for the road network which are likely caused by errors in the predefined map data; and provide details of the one or more identified anomalies for use in obtaining additional data for the specific locations on the road network corresponding to the one or more identified anomalies in order to correct the errors in the predefined map data.

By limiting the additional data acquisition to those specific locations corresponding to the anomalies which are likely caused by errors in the map data, the amount of data required to update the map and the associated costs are reduced relative to existing systems.

Before the present apparatus can identify anomalies relating to errors in the map data, the various anomalies between the monitored trajectory and the predefined map data need to be detected. The present apparatus may also be configured to perform this step. In this respect, the apparatus may be configured to compare the monitored trajectory and predefined map data to detect any anomalies therebetween prior to (or jointly with) use of the classification model. Additionally or alternatively, the apparatus may be configured to compare two or more monitored trajectories of the vehicle as determined simultaneously by different respective sensors on the vehicle to detect any anomalies therebetween prior to (or jointly with) use of the classification model. The anomalies themselves may comprise discrepancies in one or more of position, speed and course between the monitored trajectory and predefined map data.

One specific example of anomaly detection will now be described. When detecting anomalies, every data point is defined as an event containing a timestamp and a list of sensor observations (e.g. position, speed, course). The data points are observed in sequences which are referred to herein as vehicle trajectories. The anomalousness probability of a sensor observation is obtained by performing a likelihood ratio test between the two hypotheses that the observation is explained by the road network or that the observation was emitted uniformly with a flat prior from free space:

$$\Lambda = \frac{likelihood_{road}}{likelihood_{flat}}$$

In order to determine the hypothesis that the observation is explained by the road network (i.e. the numerator of the likelihood ratio), the assumption that the vehicle is driving on the road network is utilised to derive a plurality of different paths of travel (or "road rails") representing the possibilities that the vehicle has to traverse the road network. A path of travel in this context consists of a drivable sequence of contiguous road segments in two or three dimensions reflecting the trajectory of the vehicle so far. The present apparatus may be configured to determine the plurality of different paths of travel by map-matching at least one known location of the vehicle with the predetermined map data. This involves finding a list of road segments near the known location and, for each road segment, creating a path of travel comprising that road segment. If the road segment can be traveled in both directions, two paths of travel may be created which extend in opposite directions from each end of the road segment.

Once the plurality of different paths of travel have been determined, the apparatus is configured to compare data received from a sensor (or a plurality of sensors) on the vehicle with predetermined map data (e.g. a digital map, street level and aerial imagery, road coordinates, speed limits, road restrictions, etc) for each path of travel using respective recursive Bayesian filters. For example, the sensor may be a global navigation satellite system receiver, and the apparatus may be configured to compare geographical coordinates from the satellite data with the stored coordinates of a digital map. Similarly, the sensor may be a camera, and the apparatus may be configured to compare images recorded by the camera with stored street level images taken at various locations on the road network. The latter scenario may be particularly useful for detecting lanes or exits on a stretch of road.

Each recursive Bayesian filter calculates a likelihood of the vehicle being currently located on the respective path of travel. The likelihood is therefore a measure of how well the respective path of travel fits the sensor data. In some cases, however, the likelihoods associated with each of the different paths of travel may indicate that none of these paths of travel sufficiently fit the sensor data (e.g. because the likelihoods are below a predefined threshold). In this scenario, the apparatus may be configured to determine one or more additional paths of travel. This may be achieved by map-matching (as described above), or by considering other paths of travel in proximity to the existing paths of travel. In some cases, none of the additional paths of travel may fit the sensor data either, which could indicate an error in the map data.

The distribution of the test statistics $\Lambda$ can be characterized by a $\chi^2$ distribution with the degree of freedom as the difference of the numbers of free parameters in both likelihood models:

$$-2 \log(\Lambda) \sim \chi^2(\text{dof}_{road} - \text{dof}_{flat})$$

The degree of freedom of the road model corresponds to the number of dimensions in the observation vector, and $\text{dof}_{flat}=0$. This enables an estimation of the probability that the current observation is anomalous given the state and observation values p(anomaly=1|state,observation).

It is also important to take account of the fact that it is unlikely that such a model will oscillate between an anomaly and normal state on a typical trajectory. The model should therefore remain on one of these states for several observation points. This is solved by returning a maximum likelihood decoding of a discrete time Markov chain that gives the most likely contiguous segments of anomalous and normal states on the trajectory. The contiguousness is ensured by representing the transition probability with an exponential distribution parametrized by rates $\lambda_{road}$, $\lambda_{flat}$. The two-state system (i.e. anomalous and normal states) is defined with a pre-determined probability of anomaly, $p_0$, the observation probability as determined by the likelihood ratio model p(anomaly|state,observation), and the state transition matrix $T(\Delta t)$:

$$T(\Delta t) = \begin{bmatrix} 1 - e^{-\lambda_{road}\Delta t} & e^{-\lambda_{road}\Delta t} \\ e^{-\lambda_{flat}\Delta t} & 1 - e^{-\lambda_{flat}\Delta t} \end{bmatrix}$$

The terms in the transition matrix represent the probability of moving from one state to another as determined by the transition rates. For example, on longer time deltas, the probability of accepting one hypothesis versus another increases if the observation anomalousness probabilities are sufficient.

Given these three parameters, a Viterbi decoding is then performed to determine which subsequences of the trajectory represent anomalous events. Although the nature of these anomalies is still unknown (and many of them could be false positives), they generate a dataset that can be further explored.

Once the anomalies have been detected, the classification model is used to assign each of the different anomalies to a particular class. In this problem, the target variable for every data point is a discrete class or a superset of them. That is, for every data point $x_i$, a model f is found that is able to produce predictions for the class of the anomaly taking account all preceding data points in the trajectory: $y_{pred(i)}=f(x_i;x_{i-1}, \ldots x_0)$. The examples described herein are constructed as event chains with up to 30 seconds of preceding events. There are several variations on how these event chains may be processed. Two different types of classification are described below: sequence-based classification and window-based classification. In both types, the classification is performed based on one or more features of the discrepancies between the monitored trajectory and the predefined map data. These features may comprise one or more of: discrepancies in position, velocity and heading; the cumulative change of heading within a time window; the likelihood of the sensor observation given the estimated state as given by the positioning system; the ratio of likelihoods between the one given by the map-matching positioning system and the one given by the flat prior model (described above); the ratio of likelihoods between the one given by the map-matching positioning system and the one given by a free-space positioning system; the likelihood as obtained from a partial sensor observation containing only the measurements of lateral position and heading when compared to the map geometry as given by the positioning system; the state covariance feature set having a covariance value for every combination of state dimensions; the innovation covariance feature set having a covariance value for every combination of observation dimensions; the anomaly class of the previous data point; and the time since the last initialization (age) of the candidate.

In sequence-based models, the trajectories are considered to be chains of events where every individual event is annotated with a class (as opposed to the entire trajectory). The free parameters in this model that need to be trained are weights for individual event features and transition rates from one anomaly class to another. This approach was described above in relation to anomaly detection using a two-state discrete-time Hidden Markov Model in which the entire trajectory was decoded to obtain the most likely sequence of states. The advantage of a discrete-time sequence model is that the resulting sequences are relatively contiguous and free of fast oscillations between anomalies and non-anomalies.

The sequence-based approach may be used for anomaly classification simultaneously with anomaly detection by considering the possibility of several different states (i.e. various distinct classes) rather than a binary two-state system (i.e. anomaly vs no anomaly). In this scenario, however, the model has more free parameters: a transition rate matrix between all pairs of states, and a feature weight matrix describing the influence of every observed feature for every possible every state where the goal is to infer the most likely (or most optimal) sequence.

Sequence-based classification allows the use of several classes of sequence modeling, such as Hidden Markov Models (as described above), Conditional Random Fields or Recurrent Neural Networks.

Window-based classification, on the other hand, is a method to convert a sequence classification problem to a typical example classification problem by means of reducing the entire sequence into a single feature vector. For example, given that every example sequence can be described with feature i at step j as $x_{ij}$, a windowed reduction of the features as $x_{reduced,i}=\text{reduction}_{j,j-k}(x_{ij})$ can be obtained, where the reduction happens over a window size of k, using one or more of the following operations: mean, median, variance, minimum, maximum and delta (difference from first to last value). All meaningful reductions of the features across the sequence can then be generated, and any standard supervised classification approach can be used to implement it. The window-based classification technique also exhibits the property of temporal consistency, meaning that it does not switch erratically between different states. It can therefore also be used as a joint anomaly detection and classification model.

In order to demonstrate the classification of identified anomalies, data from 21 drivers was obtained from a global data collection campaign in which 828 features were detected as anomalous at the initial anomaly detection step. The vehicles were equipped with positioning devices that recorded their position, velocity and course. In this experiment, the classification model was configured to classify the detected anomalies into the following classes: "on-road", "off-road", "illegal maneuver", "sensor irregularity" and "unlikely geometry".

FIGS. 2a-2e show examples of the different anomaly classes. The "on-road" class (FIG. 2a) represents no anomalous behavior other than minor sensor or positioning errors (e.g. due to noise). In this example, the vehicle trajectory 209 follows the path of the road 210 but is slightly biased.

The "off-road" class (FIG. 2b) represents an off-map event. In this example, the driver has parked his/her vehicle 211 just off the road 210 (e.g. on a driveway, garage or unmapped car park). Other examples of off-road events include journeys through rural areas (e.g. over fields or a private road) or a significant short-cut outside the road network.

The "illegal maneuver" class (FIG. 2c) represents an impossible on-map trajectory when the sensor signal and map are likely fine. In this example, the driver has made a U-turn 212 that jumps from one road segment to its counterpart going in the opposite direction despite there being no valid connection therebetween. Other illegal maneuvers include driving the wrong way down a one-way street, turning the wrong way at a no-left-turn or no-right-turn junction, or ignoring a no-entry sign.

The "sensor irregularity" class (FIG. 2d) represents a problem with the sensor or a difficulty in obtaining the sensor data, such as sensor malfunctions, invalid sensor data (e.g. outside sensor range), non-Gaussian noise (e.g. strong bias of GNSS signal in one direction), non-stationary noise (e.g. GNSS behaves worse in built-up areas), and temporal or spatial gaps in the sensor data. In this example, a gap 213 is caused by an overpass blocking the GNSS signal resulting in a lack of data points at that location. Sensor gaps 213 appear as jumps where the reported location after a time gap is significantly further away, and can also be caused by signal interference, buildings, mountains, trees, tunnels or faulty sensors.

The "unlikely geometry" class (FIG. 2e) represents good positioning but a low likelihood as a result of minor mismatches in geometry and trajectory. In this example, the one-dimensional road representation 210 in the map data does not reflect the width of the physical road. As a result, the vehicle trajectory 209 exhibits a significant lateral offset.

The actual (i.e. real) counts of data points of every detected anomaly class were as follows: "On-road": 440; "Off-road": 250; "Illegal maneuver": 29; "Sensor irregularity": 93; and "Wrong geometry": 9.

In order to pose this as a classification test, a feature representation had to be defined. In this particular experiment, it was preferable that the model took account of as few features as possible in order to reduce computational demands at run-time. In this respect, the features used were: log likelihood from the positioning system; U-turn (final difference of heading between start and end sensor points); length (distance, time, number of samples); off-road filter features (off-road score, off-road state); observations (velocity, course); state variables (velocity, course); state covariance matrices; and discrepancies between position estimate and observed positions (expressed as absolute distances). Furthermore, since every data point is composed of several sensor points, every feature was aggregated using its mean, variance, minimum, maximum and first-to-last delta value.

In this experiment, two different classifiers comprising supervised machine learning algorithms were tested: an L1-regularized logistic regression classifier and a random forest classifier. The former classifier fits a linear model with a sparsity-enforcing penalty resulting in fewer non-zero coefficients which makes the results easier to interpret. In this case, dataset standardization was also performed by taking the features, subtracting their means, and dividing them by their variance. The latter classifier constructs an ensemble of decision trees, making for an expressive non-linear model that can take into account feature combinations but is more difficult to interpret. The performance of each classifier was measured with an F1 score (a balanced metric of precision and recall), and a confusion matrix was generated to graphically illustrate which classes of anomaly the L1-regularized logistic regression classifier had difficulty distinguishing between.

Figure 3:
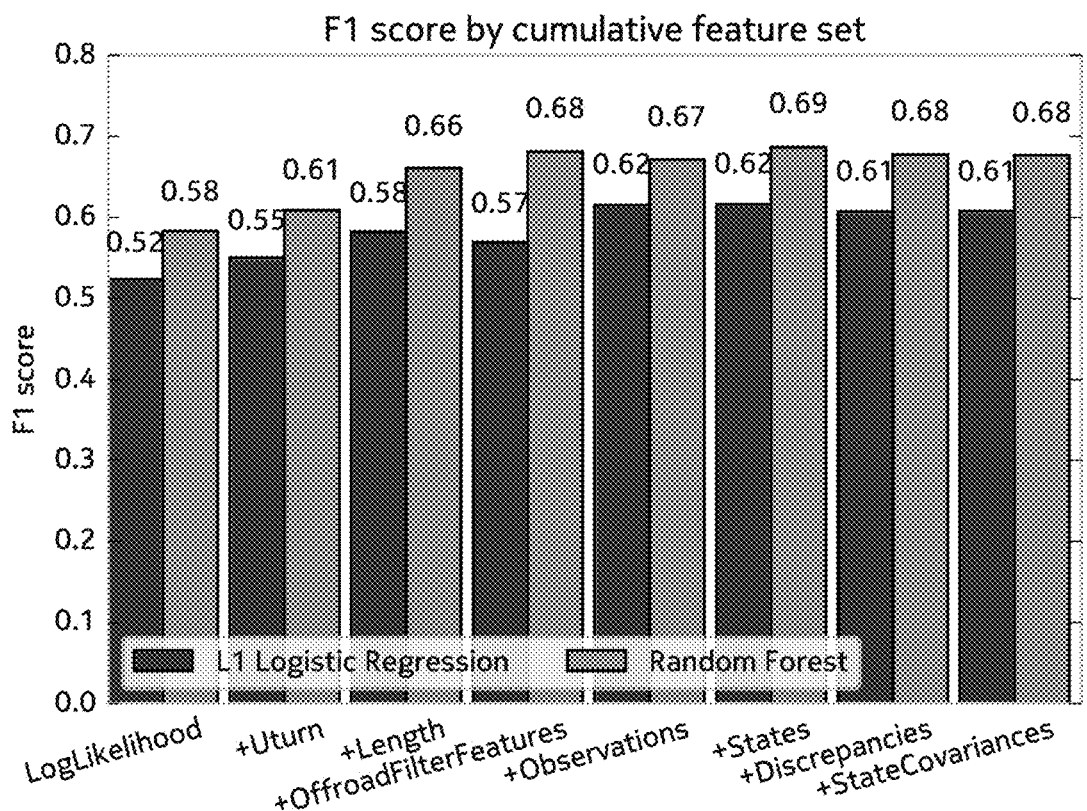
FIG. 3 shows the measured performance of two different supervised machine learning algorithms during a classification test.

FIG. 3 shows the F1 scores of the two different classifiers. As can be seen, the performance of the random forest classifier plateaued at 0.69 and the L1-regularized logistic regression classifier at 0.62, with nearly every feature set making a positive contribution.

Figure 4:
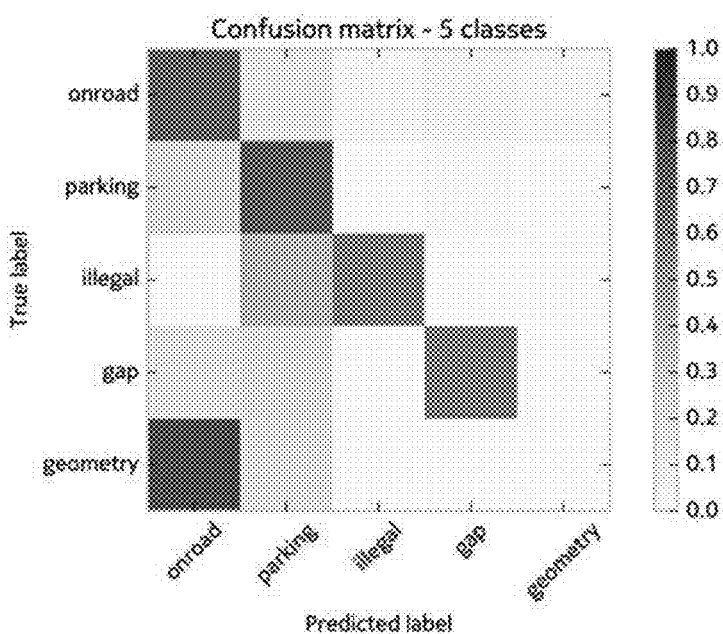
FIG. 4 shows a confusion matrix showing the results of the classification test for each class of anomaly.

FIG. 4 shows the confusion matrix for the L1-regularized logistic regression classifier. Whilst the model picked up on on-road, off-road (parking) and sensor irregularity classes reasonably well, unlikely geometry errors were indistinguishable from normal on-road behavior. Also, illegal maneuvers were easily confused for parking events. The confusion occurred because the sensor fusion happened on the device itself. This suggests that pre-fused data is insufficient for detecting geometry errors but can still distinguish between other classes of anomaly. Reliable detection of off-road behavior therefore requires means to rule out other anomalies that can have similar signatures but different root causes. Some of these, especially those relating to sensor data itself, can be done in the scope of the positioning system by having them explicitly handled in its dynamics model, but that has the effect of increasing the degree of freedom of the system. Alternatively, a dataset with a higher positioning sensor accuracy (to more easily rule out sensor irregularities and on-road behavior), as well as multiple drivers on the same road network, may be used.

Once the detected anomalies between the vehicle trajectory and the predefined map data have been detected and classified, the apparatus may be configured to obtain the additional data for the locations on the road network corresponding to the identified anomalies, and update the predefined map data using the obtained additional data to correct the errors therein. In other examples, however, the apparatus may be configured to provide details of the identified anomalies to a further apparatus (e.g. server or central computer) which aggregates the anomalies for multiple vehicles by time, location and category and obtains the additional data for the locations on the road network corresponding to the aggregated anomalies.

In both scenarios, the additional data may be obtained from one or more of an embedded vehicle-based data collector, a crowd-sourced fleet of vehicles, a specially-equipped vehicle with suitable sensors (such as a global navigation satellite system (GNSS), an odometer, an inertial measurement unit, an inertial navigation system, an accelerometer, a gyroscope, a camera, a RADAR system and a LiDAR system), a downloadable map update, and satellite or aerial imagery. When using a crowd-sourced fleet of vehicles, data collection instructions may be embedded in the specific locations on the map that need updating.

Figure 5:
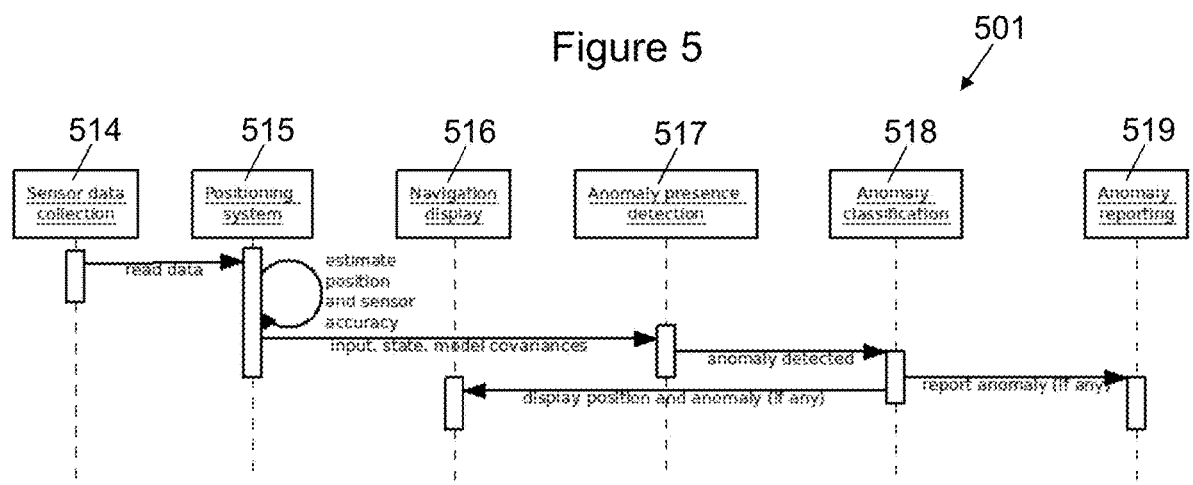
FIG. 5 shows one half of a system configured to perform a method described herein.
Figure 6:
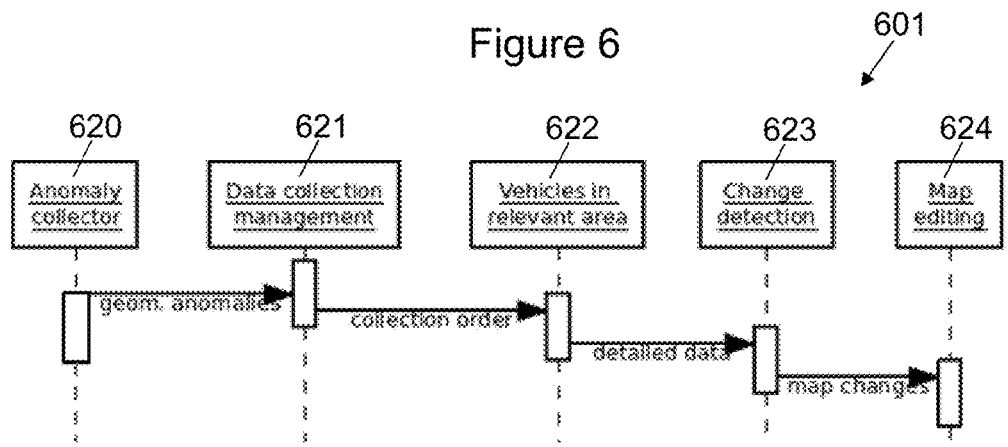
FIG. 6 shows the other half of a system configured to perform a method described herein.

FIGS. 5 and 6 show the different respective parts of a distributed system for performing the method described herein. The apparatus 501 of FIG. 5 (the first apparatus) may form at least part of a portable or in-vehicle satellite navigation device. The apparatus 501 comprises a sensor data collection module 514, a positioning system 515, an electronic display 516, an anomaly detection module 517, an anomaly classification module 518, and an anomaly reporting module 519.

The sensor data collection module 514 collects data from one or more vehicle on-board sensors, and the positioning system 515 uses the sensor data to estimate the current vehicle position (and trajectory) on a map of the road network which is shown on a user interface of the electronic display 516. The anomaly detection module 517 is configured to compare the estimated position with the existing map data (and/or compare the estimated position based on sensor data from two or more different sensors) to detect any anomalies, and the anomaly classification module 518 is configured to classify the detected anomalies and provide the details of any anomalies which are likely caused by errors in the predefined map data to the anomaly reporting module 519 (e.g. via a cloud-based network). The electronic display 516 may also be configured to show the detected anomalies on the user interface in addition to the map of the road network.

The apparatus 601 of FIG. 6 (the second apparatus) may form at least part of a server or central computer. The apparatus 601 comprises an anomaly collection module 620, a data collection management module 621, a change detection module 623, and a map editing module 624. The anomaly collection module 620 is configured to receive the details of the detected anomalies from the anomaly reporting module 519 of the first apparatus 501, and aggregate the anomalies for multiple vehicles by time, location and category. The data collection management module 621 then receives details of the aggregated anomalies, and issues a data collection campaign order to one or more vehicles 622 instructing them to obtain additional data (e.g. more detailed data) for the locations on the road network corresponding to the aggregated anomalies. Once the additional data has been obtained from the one or more vehicles 622, the change detection module 623 determines whether or not the existing map data needs to be updated (i.e. because there are discrepancies between the old and new map data), and then the map editing module 624 updates the map data if necessary.

In some cases, the anomaly detection 517 and anomaly classification 518 modules of the first apparatus 501 may form part of the second apparatus 601. In this scenario, the second apparatus 601 may be configured to receive the sensor data (or estimated position/trajectory) from the first apparatus 501 and perform the anomaly detection and classification itself.

Furthermore, the one or more vehicles 622 tasked with obtaining the additional data may comprise the vehicles comprising the first apparatus 501. In this situation, the sensor data collection module 514 may be configured to store the raw data received from the on-board sensors (e.g. in a buffer) and provide this data to the second apparatus 601 in response to the data collection campaign order.

Figure 2A:
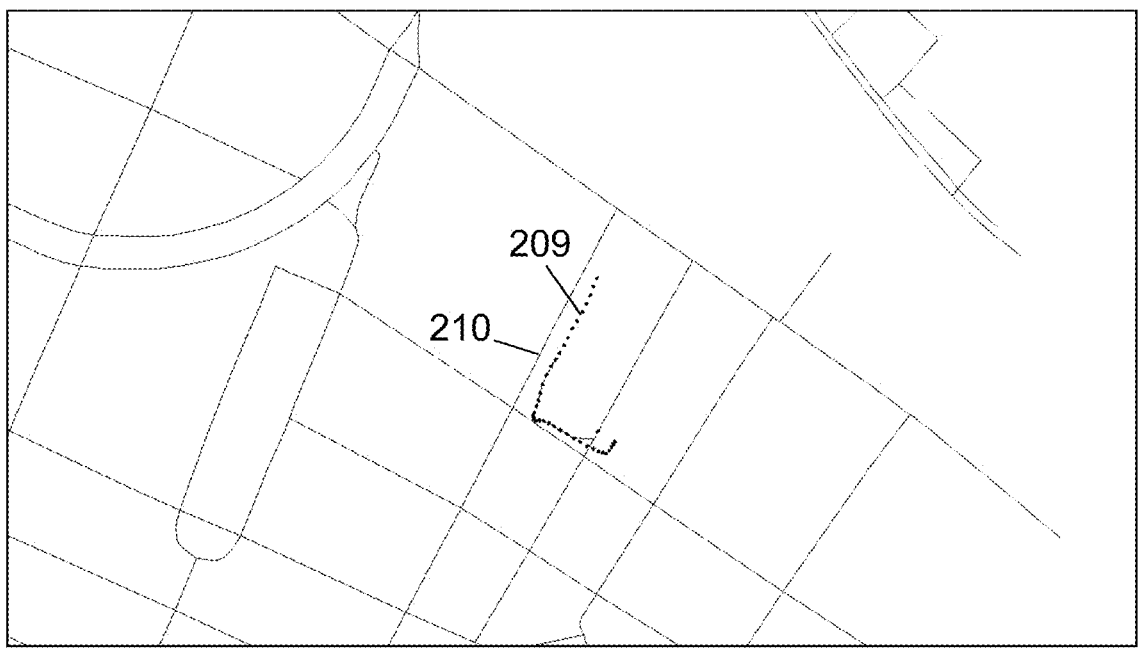
FIG. 2*a* shows one example of an "on-road" anomaly.
Figure 2B:
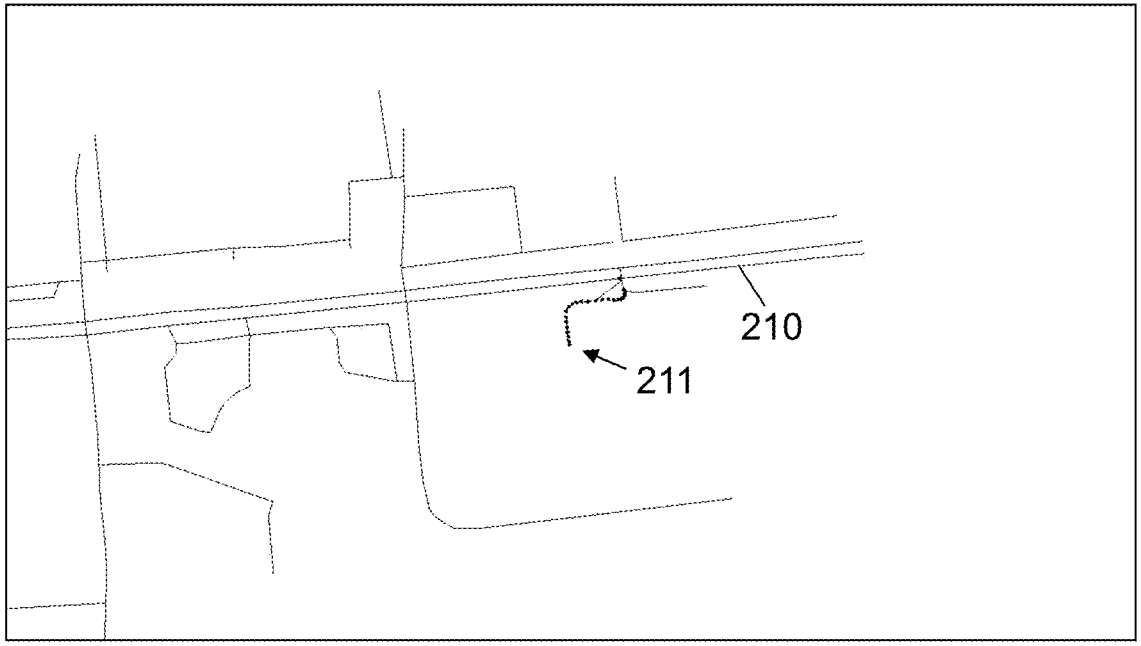
FIG. 2*b* shows one example of an "off-road" anomaly.
Figure 2C:
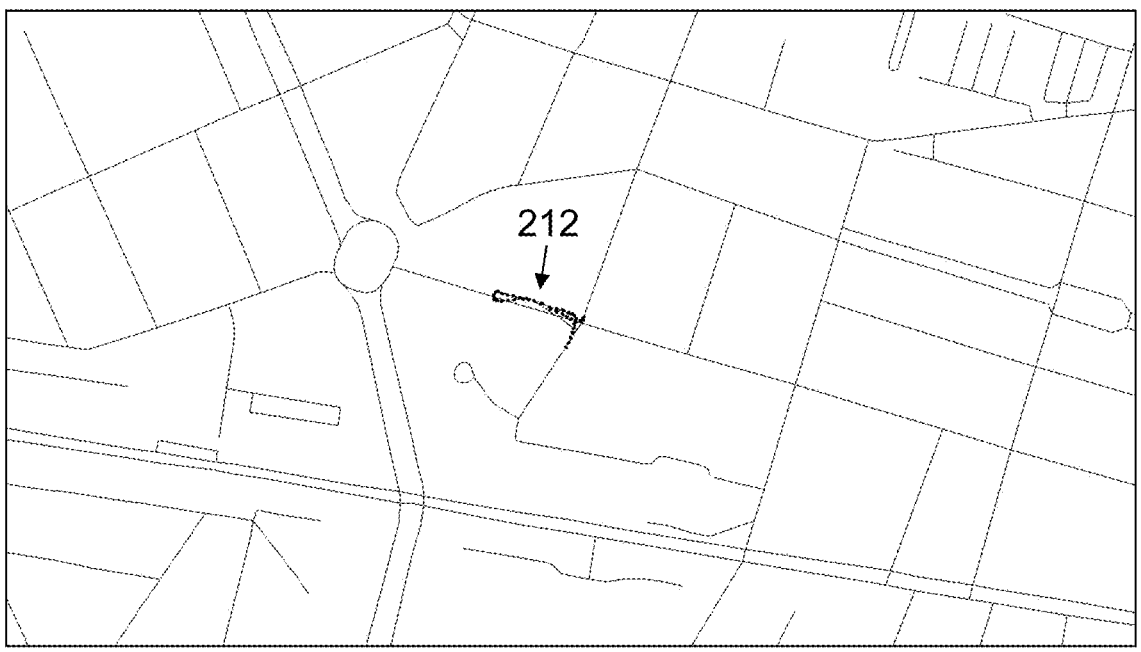
FIG. 2*c* shows one example of an "illegal manoeuvre" anomaly.
Figure 2D:
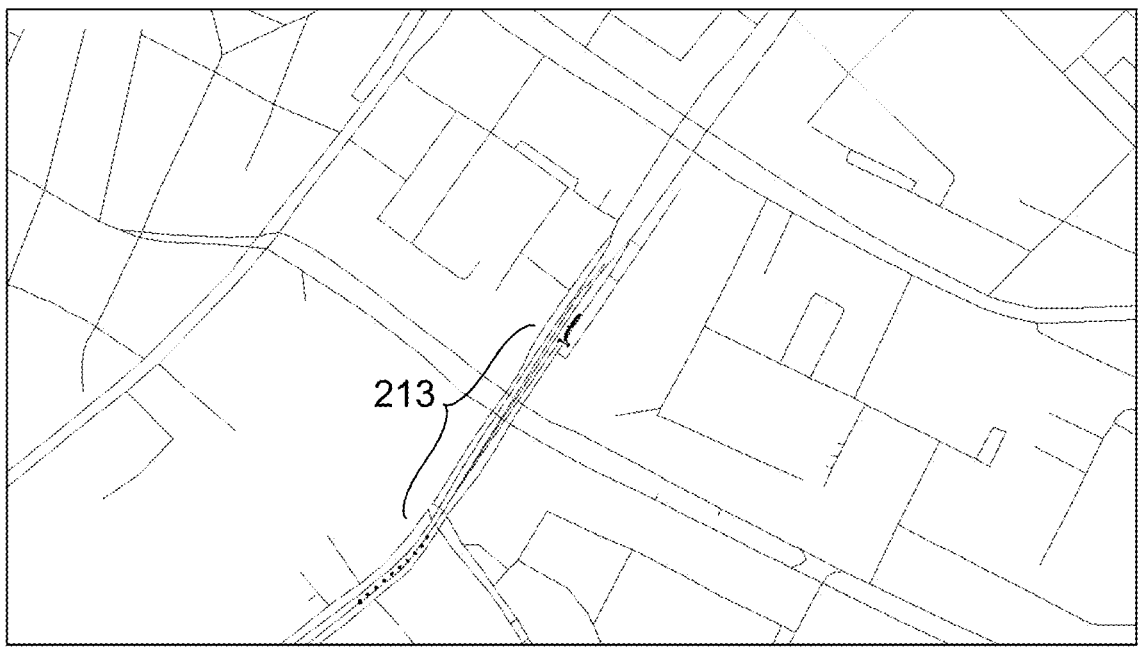
FIG. 2*d* shows one example of a "sensor irregularity" anomaly.
Figure 2E:
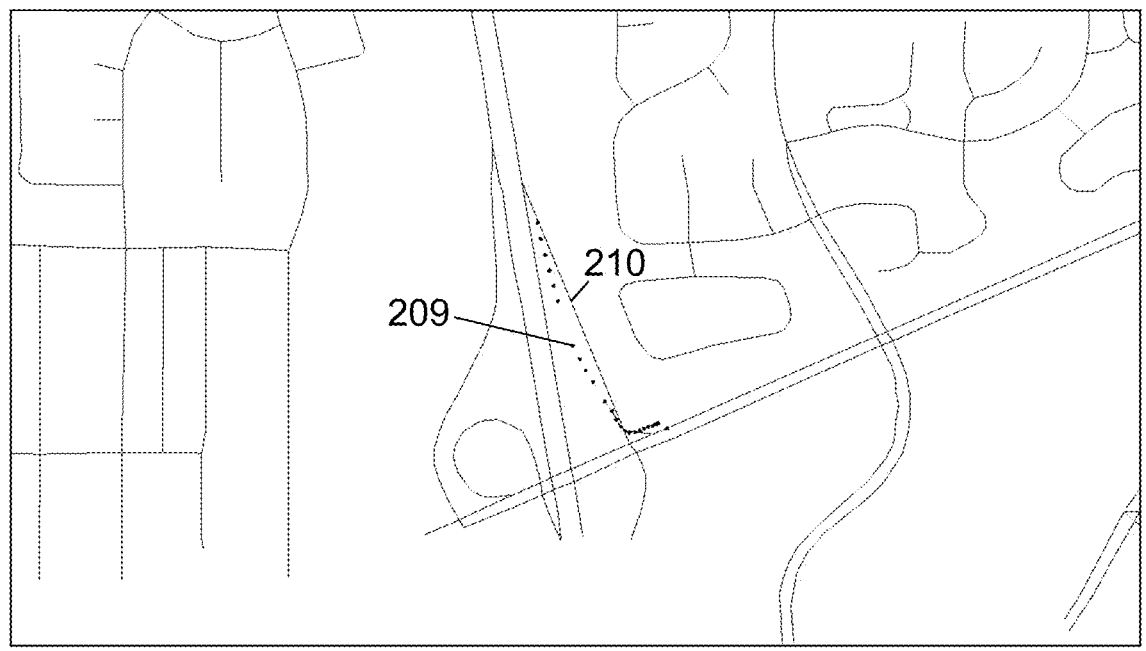
FIG. 2*e* shows one example of an "unlikely geometry" anomaly.

The first 501 or second 601 apparatus may be further configured to use the classification model to identify one or more anomalies which are likely caused by driver behavior (e.g. "off-road" or "illegal maneuver" classes illustrated in FIGS. 2b and 2c), and provide user feedback based on the driver behavior. The user feedback may comprise navigation guidance to assist the driver in navigating the unconventional route.

Similarly, the first 501 or second 601 apparatus may be further configured to use the classification model to identify one or more anomalies which are likely caused by at least one of sensor errors and positioning errors (e.g. "sensor irregularity" class illustrated in FIG. 2d), and provide user feedback based on the sensor or positioning errors. The user feedback may comprise a visual or audible warning to let the driver know not to rely on the navigation guidance for that part of the road network.

Figure 7:
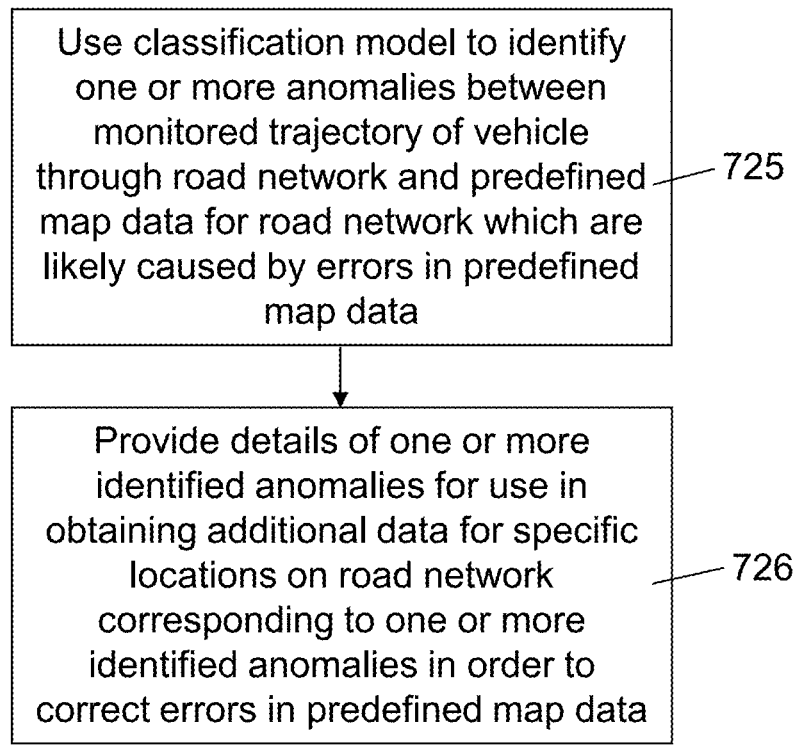
FIG. 7 shows the main steps of a method described herein.

FIG. 7 shows the main steps 725-726 of a first method described herein. The method generally comprises: using a classification model to identify one or more anomalies between a monitored trajectory of a vehicle through a road network and predefined map data for the road network which are likely caused by errors in the predefined map data 725; and providing details of the one or more identified anomalies for use in obtaining additional data for the specific locations on the road network corresponding to the one or more identified anomalies in order to correct the errors in the predefined map data 726.

Figure 8:
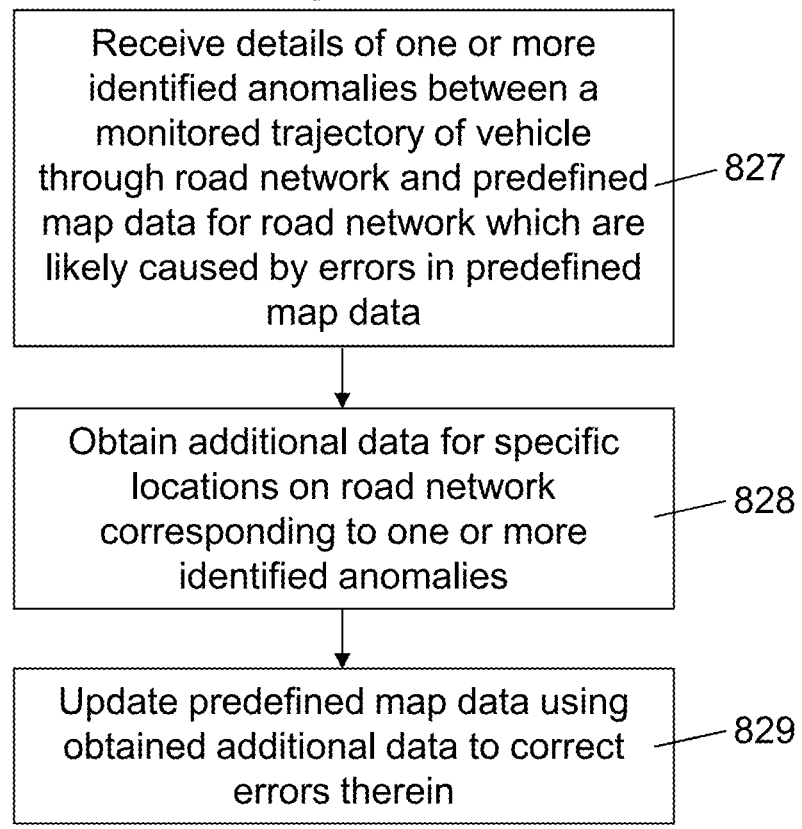
FIG. 8 shows the main steps of another method described herein.

FIG. 8 shows the main steps 827-829 of a second method described herein. The method generally comprises: receiving details of one or more identified anomalies between a monitored trajectory of a vehicle through a road network and predefined map data for the road network which are likely caused by errors in the predefined map data 827; obtaining additional data for the specific locations on the road network corresponding to the one or more identified anomalies 828; and updating the predefined map data using the obtained additional data to correct the errors therein 829.

Figure 9:
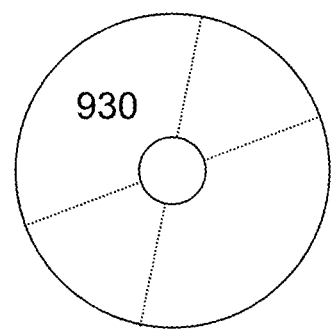
FIG. 9 shows a computer-readable medium comprising a computer program configured to perform, control or enable one or more methods described herein.

FIG. 9 shows a computer/processor readable medium 930 providing a computer program according to one embodiment. The computer program may comprise computer code configured to perform, control or enable one or more of the method steps 725-829 of FIG. 7 or 8. In this example, the computer/processor readable medium 930 is a disc such as a digital versatile disc (DVD) or a compact disc (CD). In other embodiments, the computer/processor readable medium 930 may be any medium that has been programmed in such a way as to carry out an inventive function. The computer/processor readable medium 930 may be a fixed or removable memory device such as a hard drive, solid-state drive, memory stick (e.g. USB memory stick) or memory card (e.g. compact flash, SD, mini SD, micro SD or nano SD). The computer code may be installed at the factory where the apparatus (e.g. portable or in-vehicle satellite navigation device), or vehicle comprising the apparatus, is being assembled. Later updates to the system may be made via the computer/processor readable medium 930 mentioned above.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising a processor and memory including computer program code, the memory and computer program code configured to, with the processor, enable the apparatus at least to:

from a plurality of monitored trajectories of a vehicle through a road network including a first monitored trajectory, compare two or more of the monitored trajectories of the vehicle as determined simultaneously by different respective sensors on the vehicle to detect any anomalies between the two or more monitored trajectories, the two or more monitored trajectories each comprising a sequence of data points with each data point representing a location of the vehicle at a respective time;

from the detected anomalies, identify, using a classification model, one or more anomalies likely to be caused by errors in predefined map data for the road network based at least on a likelihood ratio between a map-matched positioning of the vehicle and a flat prior model, wherein the two or more of the monitored trajectories are compared prior to or jointly with using the classification model;

provide details of the one or more identified anomalies including location information for use in obtaining data for specific locations on the road network corresponding to the one or more identified anomalies in order to correct the errors in the predefined map data; and update the predefined map data using the obtained data to correct the errors.

2. The apparatus of claim 1, wherein the sensors comprise at least one of a global navigation satellite system, an odometer, an inertial measurement unit, an inertial navigation system, an accelerometer, a gyroscope, a camera, a RADAR system and a LiDAR system.

3. The apparatus of claim 1, wherein the classification model is further configured to classify one or more anomalies other than the identified anomalies into one or more of the following classes: on-road, off-road, illegal maneuver, sensor irregularity, or mis-matched geometry.

4. The apparatus of claim 1, wherein the classification model comprises a supervised machine learning algorithm.

5. The apparatus of claim 1, wherein the anomalies comprise discrepancies in one or more of position, speed and course.

6. The apparatus of claim 1, wherein the apparatus is configured to:

obtain the data for the specific locations on the road network corresponding to the identified anomalies; and update the predefined map data using the obtained data to correct the errors therein.

7. The apparatus of claim 1, wherein the apparatus is configured to provide details of the identified one or more anomalies to a further apparatus which aggregates the identified one or more anomalies for multiple vehicles by category and obtains the data for the locations on the road network corresponding to the aggregated identified one or more anomalies.

8. The apparatus of claim 1, wherein the apparatus is configured to:

use the classification model to classify one or more other anomalies to be caused by driver behavior; and provide user feedback based on the driver behavior.

9. The apparatus of claim 1, wherein the apparatus is configured to:

use the classification model to classify one or more other anomalies to be caused by at least one of sensor errors and positioning errors; and provide user feedback based on the sensor or positioning errors.

10. The apparatus of claim 1, wherein the apparatus is configured to display the road network and one or more anomalies on a user interface.

11. An apparatus comprising a processor and memory including computer program code, the memory and computer program code configured to, with the processor, enable the apparatus at least to:

receive details including location information of one or more anomalies which are identified by a classification model to be likely caused by errors in predefined map data for a road network based at least on a likelihood ratio between a map-matched positioning of the vehicle and a flat prior model, wherein the one or more anomalies that have been identified by the classification model to be likely caused by errors in the predefined map data are identified from anomalies that are detected based upon a comparison, conducted prior to or jointly with use of the classification model from a plurality of monitored trajectories of the vehicle, between two or more monitored trajectories of the vehicle as determined simultaneously by different respective sensors on the vehicle, the two or more monitored trajectories each comprising a sequence of data points with each data point representing a location of the vehicle at a respective time;

obtain data for specific locations on the road network corresponding to the one or more identified anomalies; and update the predefined map data using the obtained data to correct the identified errors therein.

12. A method comprising:

from a plurality of monitored trajectories of a vehicle through a road network including a first monitored trajectory, comparing two or more of the monitored trajectories of the vehicle as determined simultaneously by different respective sensors on the vehicle to detect any anomalies between the two or more monitored trajectories, the two or more monitored trajectories each comprising a sequence of data points with each data point representing a location of the vehicle at a respective time;

from the detected anomalies, identifying, using a classification model, one or more anomalies likely to be caused by errors in predefined map data for the road network based at least on a likelihood ratio between a map-matched positioning of the vehicle and a flat prior model, wherein the two or more of the monitored trajectories are compared prior to or jointly with using the classification model;

providing details of the one or more identified anomalies including location information for use in obtaining additional data for specific locations on the road network corresponding to the one or more identified anomalies in order to correct the errors in the predefined map data; and updating the predefined map data using the obtained data to correct the errors.

13. The method of claim 12, wherein the classification model is further configured to classify one or more anomalies other than the identified anomalies into one or more of the following classes: on-road, off-road, illegal maneuver, sensor irregularity, or mis-matched geometry.

14. The method of claim 12, wherein the anomalies comprise discrepancies in one or more of position, speed and course.

15. The method of claim 12, further comprising:

obtaining the additional data for the locations on the road network corresponding to the identified anomalies; and updating the predefined map data using the obtained additional data to correct the errors therein.

16. The method of claim 12, further comprising providing details of the identified one or more anomalies to a further apparatus which aggregates the identified one or more anomalies for multiple vehicles by category and obtains the data for the locations on the road network corresponding to the aggregated identified one or more anomalies.

17. A method comprising:
receiving details including location information of one or more anomalies which are identified by a classification model to be likely caused by errors in predefined map data for a road network based at least on a likelihood ratio between a map-matched positioning of the vehicle and a flat prior model, wherein the one or more anomalies that have been identified by the classification model to be likely caused by errors in the predefined map data are identified from anomalies that are detected based upon a comparison, conducted prior to or jointly with use of the classification model from a plurality of monitored trajectories of the vehicle, between two or more monitored trajectories of the vehicle as determined simultaneously by different respective sensors on the vehicle, the two or more monitored trajectories each comprising a sequence of data points with each data point representing a location of the vehicle at a respective time;
obtaining data for specific locations on the road network corresponding to the one or more identified anomalies; and
updating the predefined map data using the obtained data to correct the identified errors therein.

* * * * *